United States Patent [19]

Hashimoto et al.

[11] 4,028,448
[45] June 7, 1977

[54] METHOD OF MOLDING PLASTICS MATERIAL

[75] Inventors: Makoto Hashimoto; Shinzi Uehara; Tadashi Sugita, all of Yokohama; Naonori Shiina, Tokyo, all of Japan

[73] Assignee: The Furukawa Electric Co., Ltd., Tokyo, Japan

[22] Filed: Nov. 17, 1975

[21] Appl. No.: 632,686

[30] Foreign Application Priority Data

Nov. 21, 1974 Japan ............................ 49-134617
Nov. 21, 1974 Japan ............................ 49-134618

[52] U.S. Cl. ........................... 264/37; 264/45.1;
264/45.3; 264/210 R; 264/293
[51] Int. Cl.² ................... B29F 3/10; B29D 9/06;
B29D 27/00
[58] Field of Search ......... 264/325, 37, 45.1, 45.3, 264/210, 293

[56] References Cited

UNITED STATES PATENTS

| | | | |
|---|---|---|---|
| 2,516,065 | 7/1950 | McElligott | 264/325 X |
| 3,000,052 | 9/1961 | Soubier | 264/37 |
| 3,079,642 | 3/1963 | Needham | 264/313 X |
| 3,485,908 | 12/1969 | Burger | 264/325 X |
| 3,883,624 | 5/1975 | McKenzie | 264/37 |

Primary Examiner—Richard R. Kucia
Attorney, Agent, or Firm—Carroll F. Palmer

[57] ABSTRACT

A method of molding plastics material which comprises the steps of feeding plastics material into an extruder for softening and mixing; extruding the mixed mass in the form of a rod having a diameter of at least 15 mm through an extruder die; charging the extruded mass into a metal mold whose inner walls are provided with grooves to attain the smooth movement of plasticized resin; and compression molding the extruded mass while being plasticized to form a molded product.

23 Claims, 3 Drawing Figures

METHOD OF MOLDING PLASTICS MATERIAL

This invention relates to a novel method of molding plastics material and more particularly to a method capable of attaining the excellent reutilization of waste plastics material.

Waste plastics material is now thrown away in large quantities. To date, practically no other process has been adopted than burying in the ground or burning in disposing of waste plastics material. A process of thermally decomposing waste plastics material and of reutilizing the decomposition product as fuel in the form of oily low molecular weight hydrocarbons has been experimentally accomplished with success. However, this process is not applicable to a mixture of various kinds of plastics material, but only available for polyolefins. Namely, this process has experimentally attained success in reutilizing only impurity-free waste polyolefins directly discharged from a manufacturing plant.

In fact, waste plastics material consists of a mixture of various kinds. Therefore, disposal of waste plastics material has been effected either by burying in the ground or by burning as described above. However, burial of waste plastics material in the ground demands a great deal of labor and cost. Moreover, plastics material remains substantially intact in the ground, requiring a considerable dumping space. Further, when burnt, plastics material gives forth harmful gases, raising important social problems from the standpoint of preserving environmental sanitation. What is worse, the above-mentioned two disposal processes, that is, burial in the ground and burning render precious resources useless. Therefore, urgent demand has been made from various quarters to develop a reliable method of effectively reutilizing waste plastics material.

An object of this invention is to provide a molding method adapted for manufacture of thick-walled plastics moldings required to have a great mechanical strength, such as an electric wire reels and goods-carrying pallets.

Another object of this invention is to provide a method of effectively reutilizing waste plastics material.

The method of this invention comprises the steps of feeding plastics material into an extruder for softening and mixing; extruding the mixed mass in the form of a rod at least 15 mm in diameter; charging said rod into a metal mold whose inner walls are provided with grooves to attain the smooth movement of plasticized resin; and subjecting the extruded mass to compression molding while being plasticized.

This invention can be more fully understood from the following detailed description when taken in conjunction with the accompanying drawing, in which.

Figure 1:
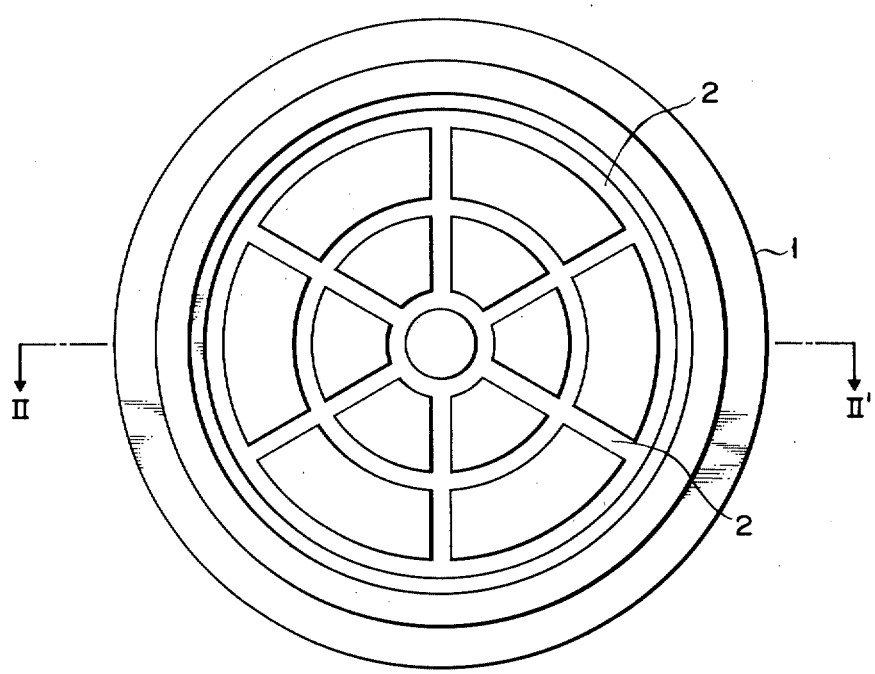
FIG. 1 is a top view of a lower metal mold for molding the flange of a wire reel according to the method of this invention.
Figure 2:
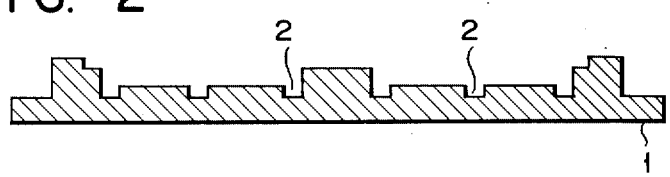
FIG. 2 is a sectional view on line II-II' of the lower mold of FIG. 1.

Plastics material used in the method of this invention may be a single kind or a mixture of two or more kinds. Where waste plastics material consisting of a mixture of various kinds is used, it is preferred that compatible kinds of plastics material, for example, polyethylene and polypropylene can be contained in large amount in the mixture. The method of this invention admits of the use of waste polyolefin material cross-linked by radiation or cross-linking agent. Since fully cross-linked polyolefin displays extremely low thermal fusing property, it is advised for the method of this invention to add at least 5% by weight, preferably at least 50% by weight of an uncross-linked or noncross-linking polyolefin. Further, waste plastics material used in the method of this invention may permissibly contain various additives such as a stabilizer, pigment and filler.

As mentioned above, the method of this invention comprises the steps of feeding plastics material into an extruder for softening and mixing, extruding the mixed mass in the form of a rod and compression molding the extruded rod in a metal mold. In this case, the extruded mass should be as much prevented from falling in temperature as possible, until it is compression molded. The reason is that the method of this invention characteristically consists in molding an extruded mass without reheating but simply with its sensible heat derived from extrusion. To this end, the rod-like extruded mass is chosen to have a diameter of at least 15 mm or preferably 25 mm or over, and in some cases 50 mm or over. The extruded mass is most preferred to have a rod shape, but need not always be so shaped. Plastics mass should be extruded at a temperature of at least 160° C or preferably 180° C or over.

The upper and lower metal molds used for compression molding in the method of this invention are characterized in that one or both of them are provided with a plurality of grooves on the inner wall, enabling a rod-like extruded mass drawn out of an extruder uniformly to flow into every portion of said inner walls. As a result, a molded product is subject to little internal stress and in consequence presents little change with time in shape. Though varying with the shape and size of a molded product, the width and depth of the grooves formed in the inner walls of the upper and lower metal molds are respectively chosen to be at least 5 mm or preferably 10 mm or over. Further, the grooves are desired to extend crosswise and lengthwise of the inner walls of the upper and lower metal molds. Application of such type of metal mold enables a plasticized rod-like extruded mass to run more uniformly into every portion of said inner walls and provides a more homogeneous molding. While the number of grooves is not subject to any limitation, the interval between the adjacent grooves is generally chosen to be 300 mm at most or preferably 200 mm at most. It is generally advised to maintain the initial temperature of a metal mold when charged with an extruded mass within the range of 10° to 80° C. Further, compression molding should generally be carried out at a pressure of 5 to 100 kg/cm² or preferably 10 to 50 kg/cm². Compression molding should be continued for a length of time ranging between 1 and 20 minutes or preferably between 2 and 5 minutes in which the molded mass remaining compressed in metal molds is expected to cool. To shorten the cooling time, however, it is desired that the upper and lower metal molds be provided with a jacket and that forced cooling be effected by running water through the jacket. Further to accelerate a molding cycle, a molded product is sometimes taken out of the metal mold while the product is not yet fully cooled. In such case, it is preferred that a discharged molded product be placed on a flat level little tending to cause the deformation of said product or supported by a deformation-preventing device so constructed as to firmly hold that portion of said product which is easily subject to deformation.

Compression molding can be carried out easily if a molded product is intended to have a large thickness. Said thickness is generally chosen to be at least 5 mm, or preferably 10 mm or over or most preferably 15 mm or over.

According to the method of this invention, virgin or waste plastics material may be blended with a smaller amount of various additives such as inorganic filler, glass fiber, asbestos fiber, fiberous glass reinforced plastics (FRP), powders and crushings of phenolic resin and other thermosetting resins, and dried sawdust. A molded product prepared from waste plastics material blended with any or combination of the above-listed additives has an improved rigidity and does not easily crackeven by a nail driven into it.

The method of this invention also enables waste plastics material to be made into a foamed molding which is expanded to a low extent of 1.3 to 2.0 times the original foaming resin volume by adding a small amount of foaming agent. This type of plastics molding is nearly free from deformation, especially shrinkage, with time and has a prominent impact strength.

The method of this invention admits of application of co-extrusion technique. Namely, it is possible to extrude one batch of waste plastics material into the aforesaid rod form through a die by an extruder and at the same time co-extrude through the same die another batch of virgin or waste plastics material by another extruder as a sheath around the periphery of the first mentioned core rod, thus providing a compression molded product by using said double-structural co-extruded mass. This process enables a core waste plastics material to be formed of a mixture of two or more types of low compatibility. Namely, it is possible to use as a core such waste plastics material containing a large variety of unidentifiable types, and also, for example, inorganic filler, and glass fiber.

The sheath plastics material should be prepared from a type of virgin or waste plastics material having high thermal fusing property, for example, a type which was previously tested to have good thermal fusing property, though its composition may be unknown, or a type having a substantially identified composition and good thermal fusing property or a type improved in thermal fusing property by adding a proper amount of virgin plastics material. A compression molded product prepared from the double-structural co-extruded mass has prominent rigidity and impact strength. Where, therefore, a core is formed of waste plastics material consisting of a plastics-metal layer composite from which the metal layer can not be easily peeled off, still there can be produced a molding having good appearance and excellent physical properties by using as a sheath another type of virgin or waste plastics material containing no metal pieces.

Further, the method of this invention enables even cross-linked waste plastics material of extremely low thermal fusing property to be used as a core. In this case, however, it is advised to use such sheath as is formed of plastics material compatible or thermally fusible with said cross-linked type. Moreover, a light compression molded product can be manufactured by blending a core plastics material with a foaming agent to expand said core to 2.0 to 10 times the original resin volume substantially without reducing the mechanical strength of the product.

The method of this invention will be more fully understood by reference to the examples which follow.

EXAMPLE 1

Figure 3:
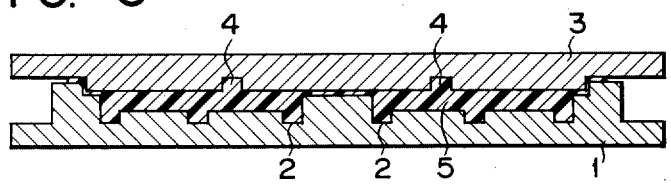
FIG. 3 is a similar sectional view to FIG. 2, showing the manner in which the molding of the flange consisting of waste plastics material is being compression molded in a combination of upper and lower metal molds.

A lower metal mold unit 1 for compression molding, shown in FIG. 1, provided with a plurality of mutually intersecting lengthwise and crosswise extending grooves 2 50 mm wide and 15 mm deep was used in molding the flanges of an electric wire reel each having an outer diameter of 940 mm and a wall thickness of 15 mm. Waste polyethylene (having a melt index of 0.25 and a density of 0.92 g/cm$^3$), used as electric cable insulation, was cut up into cubic chips measuring about 3mm on each side. These chips were extruded into a rod about 50 mm in diameter at a temperature of 220° C. The extruded rod was placed in a spiral form at the center of the inner wall of the lower metal mold unit 1. Immediately thereafter, an upper metal mold unit 3 provided, as shown in FIG. 3, with grooves 4 50 mm wide and 15 mm deep was set over the lower metal mold unit 1. The extruded rod charged into the metal mold was compression molded at a pressure of 20 kg/cm$^2$, and allowed to stand 5 minutes for cooling, providing a flange 5. The flange 5 was dropped from a height of 5 meters on a concrete floor with the surface of the flange 5 kept perpendicular to the concrete floor to determine the impact strength of said flange 5. No crack was observed in the dropped flange 5.

By way of comparison with the flange of this invention, another flange was compression molded by compressing the above-mentioned rod-like plastics material, using a metal mold whose inner walls were not provided with grooves. The control sample thus obtained indicated defects on the peripheral portion and also had an uneven surface, failing to be used as a practical flange for an electric wire reel.

EXAMPLE 2

A flange of an electric wire reel was manufactured by the following process, using the same type of metal mold as in Example 1. Waste polyethylene sheet 5 mm thick (having a melt index of 0.25 and a density of 0.92 g/cm$^3$) bonded with an aluminium sheet 0.2 mm thick was cut up into cubic chips measuring about 5 mm on each side. These chips were extruded into a core rod about 25 mm in diameter at a temperature of 180° C. Another batch of waste polyethylene (having a melt index of 0.25 and a density of 0.92 g/cm$^3$) used as electric cable insulation was cut up into cubic chips measuring about 5 mm on each side. These chips were co-extruded by another extruder as a sheath having a wall thickness of about 3 mm around the periphery of the above mentioned core rod at a temperature of 220° C. The double-structural co-extruded mass was placed in a spiral form at the center of the inner wall of the lower metal mold unit 1. An upper metal mold unit 3 was set over the lower metal mold unit 1. The charged mass was compression molded at a pressure of 20 kg/cm$^2$. An aluminium sheet contained in the core did not appear at all on the surface of a flange of an electric wire reel thus obtained. The flange had a smooth surface. When dropped from a height of 5 meters on a concrete floor in the same manner as in Example 1, the flange did not show any crack.

An attempt was made to produce a flange of an electric wire reel in substantially the same manner as in Example 2, except that cubic chips of the same type of waste polyethylene as in Example 2 were extruded, by way of comparison, into a core rod 5 mm in diameter; cubic chips of another batch of the same type of waste polyethylene were co-extruded around the periphery of the core rod as a sheath about 2 mm thick; and this double-structural co-extruded mass was used for trial in providing said flange. Since, however, the core rod had a small diameter, its temperature fell to an unduly low level before the molding of a flange was actually carried out, preventing the resin in the metal mold from freely flowing into every portion of the inner walls of the metal mold and in consequence resulting in the failure to mold a flange conformable exactly to a pattern defined by the inner walls of the metal mold. Moreover, the double-structural co-extruded mass presented insufficient thermal fusing property. When subjected to the above-mentioned drop test, the insufficiently fused portion of a flange molded from said extruded mass presented cracks.

As apparent from the foregoing Examples, the method of this invention enables waste plastics material hitherto considered difficult of disposal to be molded into a homogeneous article with a smooth surface. Moreover, the product thus molded has physical properties almost equal to those of a molded product prepared from a virgin plastics article and offers prominent practical use.

EXAMPLE 3

30 parts by weight of crushed chips of waste cross-linked low polyethylene (gel content: 909. by weight, used as electric cable insulation were mixed with 70 parts by weight of another batch of waste low density polyethylene (having a melt index of 0.25 and a density of 0.925 g/cm$^3$) and 2 parts by weight of carbon black. The whole blended mass was extruded into a rod 50 mm in diameter at a temperature of 220° C, and at the same time crushed chips of the waste noncross-linked polyethylene as above-mentioned were co-extruded as a sheath 10 mm thick around the periphery of the core rod. The double-structural co-extruded mass was subjected to compression molding at a pressure of 20 kg/cm$^2$ in a mold for manufacturing an electric wire reel whose inner walls were provided with grooves, thereby providing a pair of flanges each having a diameter of 940 mm and a thickness of 20 mm and a reel body having a diameter of 600 mm, a wall thickness of 15 mm and a height of 500 mm. The two flanges and reel body were combined into a reel assembly by four bolts. The reel assembly was wound with electric wires, the total weight thereof measuring 700 kg. The reel assembly thus wound with electric wires was dropped from a height of 3.3 meters on a concrete floor. However, the reel assembly was not deformed at all, proving that it had prominent impact strength.

EXAMPLES 4 and 5

25 parts by weight of waste cross-linked polyethylene as used in Example 3 was mixed with 75 parts by weight of waste low density polyethylene as used in Example 3 (Example 4). This mixture was further blended with 50 parts by weight of crushed chips of waste fiberous glass reinforced plastics material (Example 5). Each of these two source materials was extruded into a rod 25 mm in diameter at a temperature of 200° C, and at the same time crushed chips of another batch of waste noncross-linked polyethylene as used in Example 3 were co-extruded as a sheath 5 mm thick around the periphery of the core rod by another extruder. The double-structural co-extruded mass was subjected to compression molding at a pressure of 30 kg/cm$^2$ to provide a board 20 mm thick, 1000 mm wide and 1200 mm long by using a metal mold whose inner walls were provided with grooves 10 mm deep and 10 mm wide running crosswise and lengthwise at an interval of 200 mm. Measurement was made of the bending modulus of said board, the results being set forth in Table 1 below.

Table 1

|  | Bending modulus |
| --- | --- |
| Board of this invention (Example 4) | $3.1 \times 10^3$ kg/cm$^2$ |
| Board of this invention (Example 5) | $7.5 \times 10^3$ kg/cm$^2$ |

As clearly seen from the foregoing Examples 3, 4, 5, the method of this invention enables even cross-linked waste plastics material hitherto considered useless to be regenerated into a molded product having prominent impact strength and heat resistance, thus offering great advantage in industrial utilization of waste plastics material.

EXAMPLE 6

A mixture of 100 parts by weight of waste low density polyethylene, and 2 parts by weight of azodicarbonamide used as a foaming agent was extruded into a rod 50 mm in diameter at a temperature of 180° C, while another batch of waste high density polyethylene was co-extruded around the periphery of the core rod as a sheath 10 mm thick by another extruder at a temperature of 200° C. The double-structural co-extruded mass was subjected to compression molding in the same type of mold and under the same condition as in Example 1. A product thus molded had a light weight (a density of 0.5 g/cc) and great mechanical strength.

What we claim is:
1. A method of molding plastics material which comprises the steps of,
   a. feeding first plastics material and second plastics material into two extruders respectively for softening and mixing, said first plastics material being substantially more difficult to thermally fuse than said second plastics material,
   b. extruding through an extruder die the first plastics material in the form of a rod as a core having a diameter of at least 15mm and at the same time co-extruding the second plastics material through the same die around the periphery of said core rod as a sheath to surround said core rod,
   c. charging the double structural co-extruded mass into a metal mold of which the inner walls are provided with a plurality of grooves,
   d. applying pressure to the metal mold to mold the charge therein while the charge is plasticized, and,
   e. taking out the molded product from the mold after the plasticization is substantially brought to an end by the cooling of the molded product.
2. A method according to claim 1, wherein said rod has a diameter of at least 25 mm.
3. A method according to claim 1, wherein said rod has a diameter of at least 50 mm.
4. A method according to claim 1, wherein the double structural co-extruded mass is maintained at a tem- perature of at least 160° C immediately after drawn out of the die.

5. A method according to claim 1, wherein the double structural co-extruded mass is maintained at a temperature of at least 180° C immediately after drawn out of the die.

6. A method according to claim 1, wherein the pressure applied to the metal mold is 5 to 100 kg/cm².

7. A method according to claim 1, wherein the pressure applied to the metal mold is 10 to 50 kg/cm².

8. A method according to claim 1, wherein the metal mold is kept under pressure for a length of time ranging between 1 and 20 minutes.

9. A method according to claim 1, wherein the metal mold is kept under pressure for a length of time ranging between 2 and 5 minutes.

10. A method according to claim 1, wherein the metal mold is initially maintained at a temperature ranging between 10° and 80° C when charged with an extruded mass.

11. The method according to claim 1, wherein a molded product taken out of the metal mold is placed on a flat level until the temperature of said molded product falls substantially to room temperature.

12. A method according to claim 1, wherein a molded product taken out of the metal mold is supported by a deformation-preventing device designed securely to hold that portion of said molded product which is likely to be subject to deformation, until the temperature of said molded product falls substantially to room temperature.

13. A method according to claim 1, wherein the grooves formed in the inner walls of the metal mold have a width and depth measuring at least 5 mm.

14. A method according to claim 1, wherein the grooves formed in the inner walls of the metal mold have a width and depth measuring at least 10 mm.

15. A method according to claim 1, wherein the grooves formed in the inner walls of the metal mold are spaced 300 mm at most from each other.

16. A method according to claim 1, wherein the grooves formed in the inner walls of the metal mold are spaced 200 mm at most from each other.

17. A method according to claim 1, wherein the molded product has a thickness of at least 5 mm.

18. A method according to claim 1, wherein the molded product has a thickness of at least 10 mm.

19. A method according to claim 1, wherein the molded product has a thickness of at least 15 mm.

20. A method according to claim 1, wherein the first plastics material consists of two or more different types.

21. A method according to claim 1, wherein the first plastics material consists of a cross-linked waste plastics material and another plastics material compatible therewith.

22. The method of claim 1 wherein said first plastics material is waste plastics which is mixed in said extruder with a foaming agent forming a foaming agent containing plastics mass which is extruded in the form of said core rod and expanded to an extent of 2 to 10 times its volume upon exiting from the extruder die.

23. The method of claim 1 wherein said first plastics material is waste plastics material.

* * * * *